(12) United States Patent
Isaji

(10) Patent No.: US 6,831,595 B2
(45) Date of Patent: Dec. 14, 2004

(54) RADAR APPARATUS EQUIPPED WITH ABNORMALITY DETECTION FUNCTION

(75) Inventor: Osamu Isaji, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 10/792,453

(22) Filed: Mar. 3, 2004

(65) Prior Publication Data

US 2004/0174292 A1 Sep. 9, 2004

(30) Foreign Application Priority Data

Mar. 5, 2003 (JP) .................................. 2003-058860

(51) Int. Cl.$^7$ .................. G01S 7/40; G01S 13/536; G01S 13/00
(52) U.S. Cl. .................. 342/173; 342/70; 342/104; 342/105; 342/109; 342/118; 342/128; 342/165; 342/175; 342/195; 342/196
(58) Field of Search .................. 342/70–72, 104–118, 342/128–133, 165–175, 192–197; 244/3.15, 3.19

(56) References Cited

U.S. PATENT DOCUMENTS

| | | | | |
|---|---|---|---|---|
| 3,735,399 A | * | 5/1973 | Sletten et al. | 342/107 |
| 3,935,572 A | * | 1/1976 | Broniwitz et al. | 342/107 |
| 4,180,816 A | * | 12/1979 | Endo et al. | 342/70 |
| 5,371,718 A | * | 12/1994 | Ikeda et al. | 342/104 |
| 5,590,044 A | * | 12/1996 | Buckreub | 342/195 |
| 5,920,280 A | * | 7/1999 | Okada et al. | 342/109 |
| 6,082,666 A | * | 7/2000 | Windhorst et al. | 244/3.15 |
| 6,278,399 B1 | * | 8/2001 | Ashihara | 342/173 |
| 6,335,700 B1 | * | 1/2002 | Ashihara | 342/70 |
| 6,384,768 B1 | * | 5/2002 | Kai | 342/70 |
| 6,414,628 B1 | * | 7/2002 | Ashihara | 342/173 |

* cited by examiner

Primary Examiner—Bernarr E. Gregory
(74) Attorney, Agent, or Firm—Christie, Parker and Hale, LLP

(57) ABSTRACT

Disclosed is a radar apparatus equipped with a function for detecting an abnormality of modulation width. Distance $r_{t2}$ at time $t_2$ is calculated from the values of the distance $R_{t1}$ and the relative velocity $V_{t1}$ measured at time $t_1$ and the elapsed time $t_2-t_1$, and the difference relative to the actual measured value $R_{t2}$ is compared with a threshold value $C_1$. If the difference relative to the actual measured value exceeds the threshold value $C_1$, the modulation width is judged to be abnormal.

43 Claims, 3 Drawing Sheets

RADAR APPARATUS EQUIPPED WITH ABNORMALITY DETECTION FUNCTION

CROSS-REFERENCE TO RELATED APPLICATION

This application claims priority of Japanese Patent Application number 2003-068860, filed on Mar. 5, 2003.

BACKGROUND OF THE INVENTION

1. Field of the Invention

The present invention relates to a radar apparatus equipped with an abnormality detection function, and more particularly to an FM-CW radar apparatus equipped with a function for detecting an abnormality in the frequency modulation width.

2. Description of the Related Art

An FM-CW radar radiates forward a transmit wave frequency-modulated by a modulating signal of a triangular waveform alternating cyclically between an upsweep section and a downsweep section, and produces a beat signal by mixing the wave reflected from a target with a portion of the transmitted wave. When the frequency of the beat signal in the downsweep section is denoted by $f_b(down)$ and the frequency of the beat signal in the upsweep section by $f_b(up)$, the beat frequency $f_r$ due to the distance to the target and the beat frequency $f_d$ due to the relative velocity of the target are respectively calculated as $$f_r = (f_b(down) + f_b(up))/2 \quad (1)$$

$$f_d = (f_b(down) - f_b(up))/2 \quad (2)$$

From these, the distance R to the target and the relative velocity V of the target can be respectively calculated as $$R = c \cdot f_r \cdot T / 4\Delta F \quad (3)$$

$$V = c \cdot f_d / 2f_0 \quad (4)$$

(where c is the velocity of light, T is the period of the triangular wave, $\Delta F$ is the frequency modulation width (frequency shift width), and $f_0$ is the center frequency.) Therefore, the values of $f_b(down)$ and $f_b(up)$ associated with each target are determined from the peaks appearing in the beat signal spectrum in the frequency domain obtained by Fourier transforming the beat signal, and the distance and the relative velocity of the target are determined by calculating the equations (1) to (4).

Here, the equation (3) can be rewritten as $$f_r = 4\Delta F \cdot R / C \cdot T$$

Therefore, if the modulation width $\Delta F$ decreases, for example, to 50% for some reason, such as a failure, $f_r$ also decreases to 50% of the normal value; accordingly, the distance R calculated from the equation (3) also decreases to 50% of the actual distance, resulting in the generation of a false distance.

A possible method for detecting such a failure that causes $\Delta F$ to change would be to directly monitor the transmission frequency by using a frequency dividing circuit and a counter.

This method, however, would require that a circuit for monitoring the transmission frequency be added in the FM-CW radar construction, and would thus lead to a substantial increase in cost.

SUMMARY OF THE INVENTION

It is, accordingly, an object of the present invention to provide a radar apparatus equipped with a function for detecting an abnormality in the frequency modulation width at low cost.

A radar apparatus equipped with an abnormality detection function according to the present invention comprises: a distance measuring unit measuring a distance to a target; relative velocity measuring unit measuring a relative velocity with respect to the target; and a unit detecting a discrepancy between the measured distance and the measured relative velocity, based on the distance to the target measured by the distance measuring unit, the relative velocity measured by the relative velocity measuring unit with respect to the same target, and the elapsed time.

DESCRIPTION OF THE PREFERRED EMBODIMENTS

Figure 1:
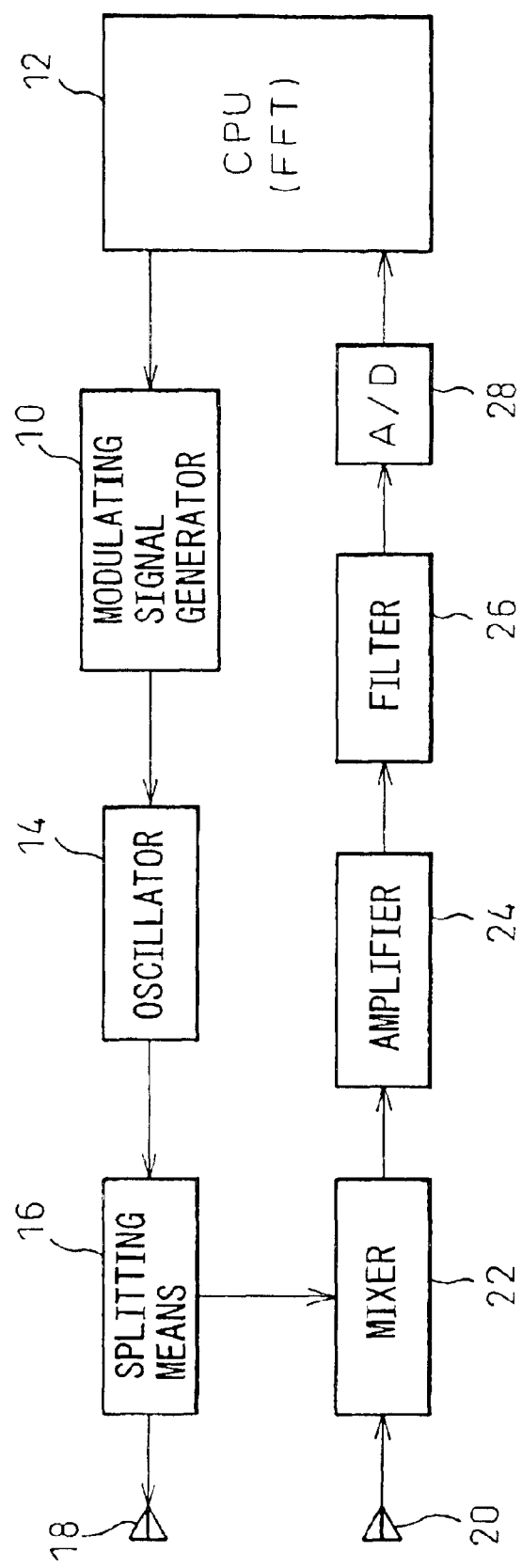
FIG. 1 is a diagram showing the configuration of an FM-CW radar to which the present invention is applied.

FIG. 1 shows the configuration of an FM-CW radar apparatus equipped with an abnormality detection function according to one embodiment of the present invention.

In FIG. 1, a modulating signal generator 10, as instructed by a CPU 12, generates a modulating signal of triangular waveform alternating cyclically between an upsweep section and a downsweep section. A voltage-controlled oscillator 14 generates a transmit wave comprising a continuous signal frequency-modulated by the triangular wave. A portion of the output of the voltage-controlled oscillator 14 is separated by a splitting unit 16 and introduced into the receiver side, while the major portion thereof is radiated forward from an antenna 18. The wave reflected by a target located forward is received by an antenna 20, and mixed in a mixer 22 with the portion of the transmitted wave to produce a beat signal. The beat signal produced in the mixer 22 is amplified by an amplifier 24, passed through a filter 26 to remove unwanted components, and converted by an A/D converter 28 into a digital signal which is supplied to the CPU 12. In the CPU 12, a fast Fourier transform (FFT) operation is applied to the digitized beat signal to transform it to the frequency domain, and then the distance R and the relative velocity V of each target are calculated in accordance, for example, with the previously given equations (1) to (4).

As previously described, if the modulation width $\Delta F$ changes for some reason such as a failure, the measured value R' of the distance to the target becomes different from the value of the actual distance R. However, even in this case, as can be seen from the equation (4), the frequency $f_d$ due to the relative velocity of the target does not change. Accordingly, if the distance and the relative velocity measured with respect to the same target are examined for a discrepancy by considering the elapsed time, an abnormality of the modulation width $\Delta F$ can be detected.

Figure 2:
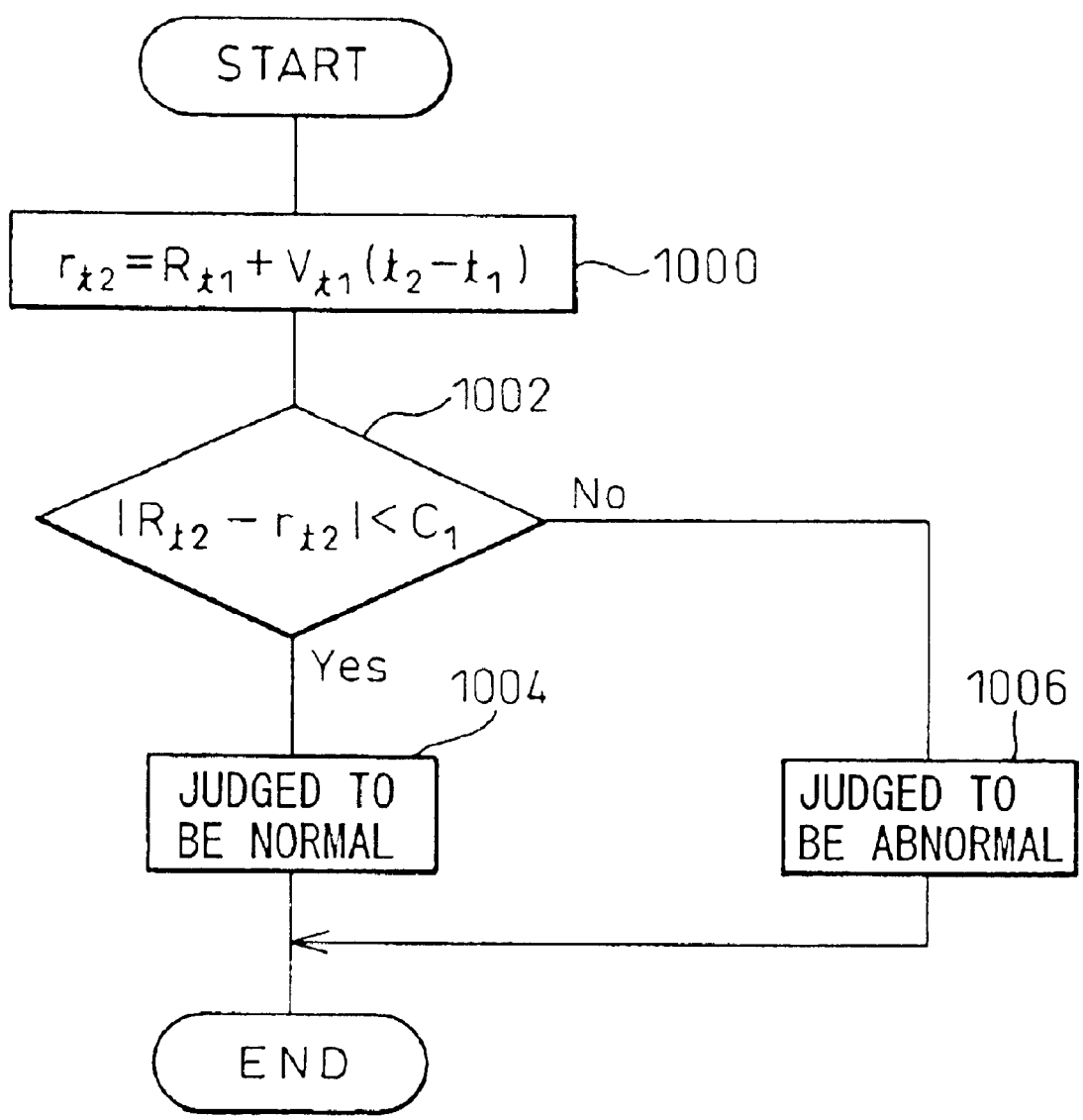
FIG. 2 is a flowchart of a modulation width abnormality detection process.

FIG. 2 is a flowchart of an abnormality detection process which is executed by the CPU 12 (FIG. 1) to detect an abnormality of the modulation width $\Delta F$ based on the above-described principle.

In FIG. 2, let $R_{r1}$ and $R_{r2}$ denote the measured values of the distance to a target obtained at times $t_1$ and $t_2$, respectively, and $V_{r1}$ and $V_{r2}$ denote the measured values of the relative velocity of the same target; then, in accordance with the equation $$r_{t2} = R_{t1} + V_{t1}(t_2 - t_1)$$

the distance $r_{t2}$ at time $t_2$ is calculated from the values of the distance $R_{t1}$ and the velocity $V_{t1}$ measured at time $t_1$ (step 1000). Next, the absolute value of the difference between the value of $r_{t2}$ and the measured value $R_{t2}$ of the distance actually obtained at time $t_2$ is compared with a predetermined threshold value $C_1$ (step 1002); if it is smaller than $C_1$, the modulation width is judged to be normal (step 1004), but if it is larger than $C_1$, the modulation width is judged to be abnormal. In the calculation of $r_{t2}$, the velocity $V_{t2}$ at time $t_2$ or the average value of $V_{t1}$ and $V_{t2}$ may be used instead of $V_{t1}$.

Figure 3:
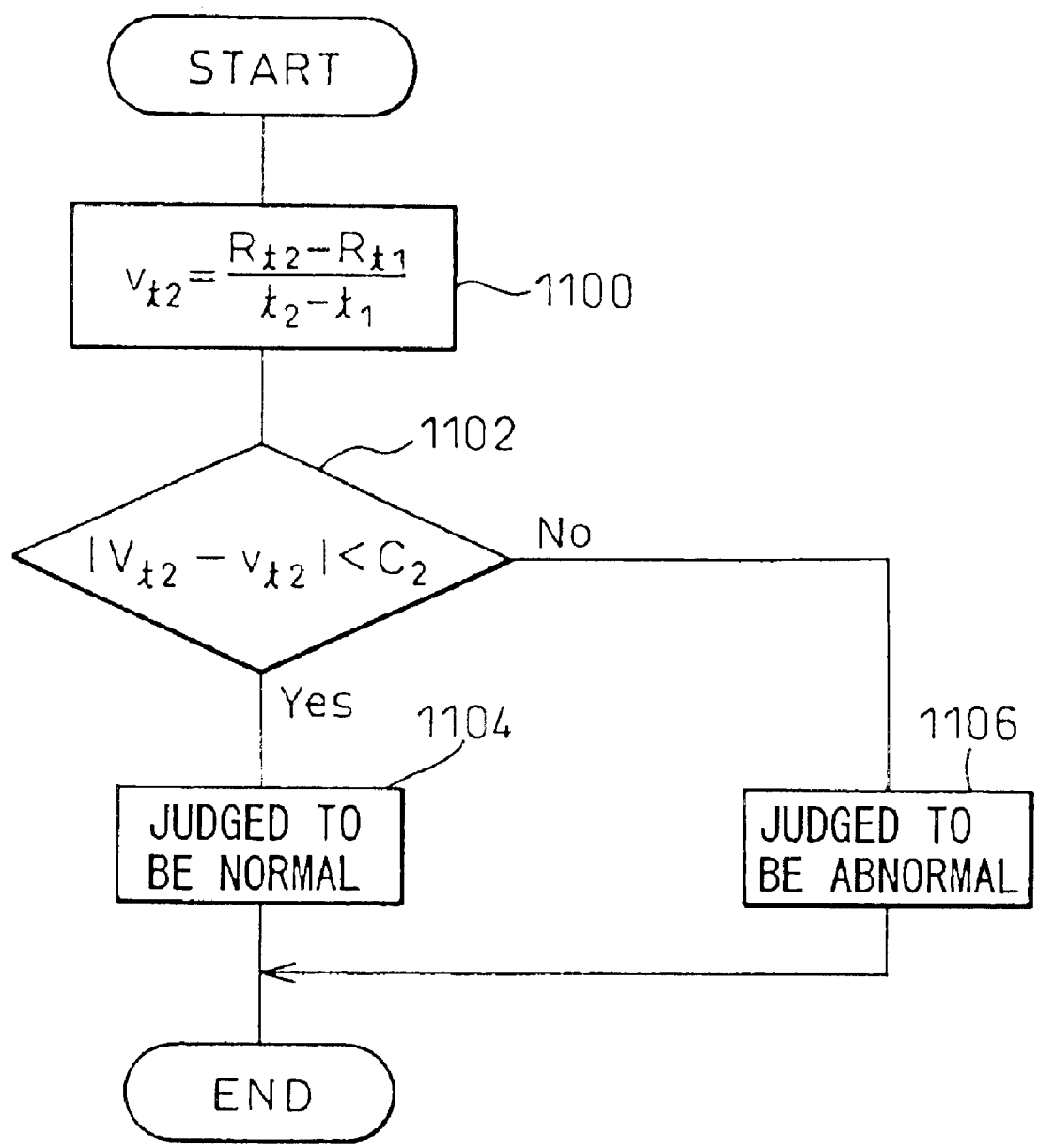
FIG. 3 is a flowchart showing one modification of the process of FIG. 2.

In an alternative example, as shown in FIG. 3, the relative velocity $v_{t2}$ at time $t_2$ is calculated from the distances $R_{t1}$ and $R_{t2}$ at times $t_1$ and $t_2$ (step 1100), and the difference relative to the actual measured value $V_{t2}$ (or $V_{t1}$) is compared with a threshold value $C_2$ (step 1102), to detect an abnormality.

In the above abnormality detection process, if the velocity of the target is close to the velocity of the radar-equipped vehicle, and the relative velocity is therefore small, the difference between the distances at times $t_1$ and $t_2$ becomes small, making it difficult to judge whether the modulation width is normal or abnormal; accordingly, it is desirable that the abnormality detection be performed only on a target whose relative velocity is larger than a predetermined threshold value $C_3$.

If the target is stationary, or if the traveling direction of the target is opposite the traveling direction of the radar-equipped vehicle, the detection becomes unstable. When the target is stationary, the relative velocity is equal to the velocity of the radar-equipped vehicle and, when the target is approaching, the relative velocity is greater than the velocity of the radar-equipped vehicle; accordingly, it is desirable to exclude such targets from abnormality detection. The velocity of the radar-equipped vehicle, for example, in the case of an automotive radar, can be determined from an output signal of a vehicle speed sensor.

A certain type of automotive radar is capable of mechanically or electronically sweeping the radiation direction of the radiowave to determine the azimuth angle $\theta$ of the target and hence determine the lateral position X of the target from $X = R\sin\theta$ ($\approx R \cdot \theta$). For a target whose lateral position X or azimuth angle $\theta$ is large, the measurement accuracy of the distance R and the relative velocity V tends to drop, and erroneous pairing tends to occur between the $f_b$(up) peak and the $f_b$(down) peak in the FFT result. Accordingly, it is desirable that any target whose lateral position X or azimuth angle $\theta$ is outside a specified range, for example, is larger than a predetermined threshold value $C_4$, be excluded from abnormality detection.

In the above-described methods, the abnormality judgment has been performed for one time interval from $t_1$ to $t_2$, but if the change in distance during each time interval, calculated from the relative velocity, is summed successively for (n−1) time intervals from $t_1$ to $t_n$ by $$\sum_{i}^{n-1} V_{ti}(t_{i+1} - t_i)$$

and if the absolute value $\Delta r$ of the difference between the sum and the amount of change $$R_{tn} - R_{t1} \left( \text{or} \sum_{i}^{n-1} (R_{t(i+1)} - R_{ti}) \right)$$

relating to the measured value of the distance is compared with a threshold value $C_5$ for abnormality detection, the accuracy of the abnormality detection can be further enhanced.

In the methods described thus far, if the measured value of the distance or the relative velocity has not been obtained at a particular time, it is desirable to make the measurement once again by invalidating the data at that particular time.

If $\Delta r$ obtained for the (n−1) time intervals is acquired a number, k, of times, with provisions made to compare its average value $$\left( \sum_{i}^{k} \Delta r_i \right) / k$$

with a threshold value $C_6$, the accuracy of the abnormality detection can be further increased.

Further, in the above process, instead of comparing $$\Delta r = \left| R_{tn} - R_{t1} - \sum_{i}^{n-1} V_{ti}(t_{i+1} - t_i) \right|$$

with the threshold value $C_5$, the value obtained by dividing $\Delta r$ by the amount of movement $|R_{tn} - R_{t1}|$ for the (n−1) time intervals, that is, $$\Delta RR = \Delta r / |R_{tn} - R_{t1}|$$

may be compared with a threshold value $C_7$.

Further, $\Delta RR$ may be acquired a number, k, of times, and its average value $$\left( \sum_{i}^{k} \Delta RR_i \right) / k$$

may be compared with a threshold value $C_8$.

In the above method that acquires k pieces of $\Delta r$ or $\Delta RR$ data and takes the average to make a judgment, if there is data missing from the k pieces of data because of a failure to obtain the measured value of the distance or the relative velocity, the total number of pieces of data acquired will fall short of the number k. In that case, the average value is obtained using data other than the missing data. If the number of pieces of missing data exceeds a prescribed number, it is desirable to invalidate the judgment result.

If the signal strength of the target is weak, the accuracy of distance or relative velocity detection may drop. In this case, to avoid an erroneous judgment, it is desirable that the judgment be made only on a target having a peak whose signal strength is larger than a certain level.

Conversely, when the signal strength of the peak is strong, as the reliability of the data is high, it is desirable that the number k over which the average is to be taken be reduced in order to shorten the judgment time.

In the case of a target whose relative velocity is high, as the migration length becomes large, the number of pieces of data over which the average is to be taken should be reduced; otherwise, the target may go out of the radar range or a change in the relative velocity may become large, resulting in a degradation of detection accuracy. In view of this, the number of pieces of data over which the average is to be taken is varied in accordance with the value of the relative velocity measured at the start of the judgment process.

If the migration length of the target is small, the judgment may become less reliable; therefore, if provisions are made to make the judgment only on a target whose migration length is larger than a prescribed length, an improvement in reliability can be achieved.

Generally, the signal level is larger and the accuracy of distance and relative velocity is higher for targets at short distance than for targets at long distance; therefore, in the case of targets at long distance, the judgment criterion is eased to reduce the chance of erroneous judgment.

To increase the reliability of the judgment, a final judgment about the occurrence of an abnormality is made after considering the continuity (when the modulation width has been judged to be abnormal a number of times in succession) or the frequency (when the ratio of the number of times that the modulation width has been judged to be abnormal in the entire judgment process is larger than a certain value).

As described above, according to the present invention, there is provided a radar apparatus equipped with a function for detecting an abnormality of frequency modulation width.

What is claimed is:

1. A radar apparatus equipped with an abnormality detection function, comprising:
   a distance measuring unit measuring a distance to a target;
   a relative velocity measuring unit measuring a relative velocity with respect to the target; and
   a discrepancy detecting unit detecting a discrepancy between the measured distance and the measured relative velocity, based on the distances to the target measured at first time and at second time by the distance measuring unit and on the relative velocity measured by the relative velocity measuring unit with respect to the same target.

2. A radar apparatus according to claim 1, wherein the discrepancy detecting unit performs the discrepancy detection only on a target whose relative velocity is larger than a predetermined threshold value.

3. A radar apparatus according to claim 1, further comprising a unit measuring a velocity of a vehicle equipped with the radar apparatus, wherein
   the discrepancy detecting unit performs the discrepancy detection only on a target whose relative velocity is substantially smaller than the velocity of the vehicle equipped with the radar apparatus.

4. A radar apparatus according to claim 1, further comprising a unit detecting azimuth angle or lateral position of the target, wherein
   the discrepancy detecting unit performs the discrepancy detection only on a target whose azimuth angle or lateral position is within a predetermined range.

5. A radar apparatus according to claim 1 wherein, when the measured value of the distance or the relative velocity has not been obtained at a particular time, the data at that particular time is invalidated and the measurement is made once again.

6. A radar apparatus according to claim 1, wherein the abnormality detection is performed only on a target whose signal strength is larger than a predetermined value.

7. A radar apparatus according to claim 1, wherein a judgment criterion is determined in accordance with the measured distance.

8. A radar apparatus according to claim 1, wherein a final abnormality judgment is made based on continuity of a judgment result.

9. A radar apparatus according to claim 1, wherein a final abnormality judgment is made based on a frequency of occurrence of a judgment result.

10. A radar apparatus equipped with an abnormality detection function, comprising:
    a distance measuring unit measuring a distance to a target;
    a relative velocity measuring unit measuring a relative velocity with respect to the target; and
    a discrepancy detecting unit computing an amount of change in distance from a measured value of the relative velocity and an elapsed time for each of a plurality of time intervals, accumulating the amount of change in distance over the plurality of time intervals, and detecting a discrepancy between the accumulated amount of change in distance and the measured amount of change in distance.

11. A radar apparatus according to claim 10, wherein the discrepancy detecting unit performs the discrepancy detection only on a target whose relative velocity is larger than a predetermined threshold value.

12. A radar apparatus according to claim 10, further comprising a unit measuring a velocity of a vehicle equipped with the radar apparatus, wherein
    the discrepancy detecting unit performs the discrepancy detection only on a target whose relative velocity is substantially smaller than the velocity of the vehicle equipped with the radar apparatus.

13. A radar apparatus according to claim 10, further comprising a unit detecting azimuth angle or lateral position of the target, wherein
    the discrepancy detecting unit performs the discrepancy detection only on a target whose azimuth angle or lateral position is within a predetermined range.

14. A radar apparatus according to claim 10, wherein when the measured value of the distance or the relative velocity has not been obtained at a particular time, the data at that particular time is invalidated and the measurement is made once again.

15. A radar apparatus according to claim 10, wherein the abnormality detection is performed only on a target whose signal strength is larger than a predetermined value.

16. A radar apparatus according to claim 10, wherein the abnormality detection is performed only on a target whose measured distance is larger than a predetermined value.

17. A radar apparatus according to claim 10, wherein a judgment criterion is determined in accordance with the measured distance.

18. A radar apparatus according to claim 10, wherein a final abnormality judgment is made based on continuity of a judgment result.

19. A radar apparatus according to claim 10, wherein a final abnormality judgment is made based on a frequency of occurrence of a judgment result.

20. A radar apparatus comprising:
    a distance measuring unit measuring a distance to a target;
    a relative velocity measuring unit measuring a relative velocity with respect to the target;
    a unit computing an amount of change in distance from a measured value of the relative velocity and an elapsed time for each of a plurality of time intervals, and computing a difference between the amount of change in distance accumulated over the plurality of time intervals and a corresponding measured value of the distance a plurality of times; and a unit detecting an abnormality based on an average value of the plurality of computed differences.

21. A radar apparatus according to claim 20, wherein the average value is computed by excluding any data missing because of a failure to obtain the measured value of the distance or the relative velocity.

22. A radar apparatus according to claim 21, wherein a judgment result is invalidated if a number of pieces of missing data is larger than a predetermined value.

23. A radar apparatus according to claim 20, wherein the abnormality detection is performed only on a target whose signal strength is larger than a predetermined value.

24. A radar apparatus according to claim 20, wherein a number of times over which the average is to be taken is determined in accordance with signal strength from the target.

25. A radar apparatus according to claim 20, wherein a number of times over which the average is to be taken is determined in accordance with a magnitude of the measured relative velocity.

26. A radar apparatus according to claims 20, wherein the abnormality detection is performed only on a target whose measured distance is larger than a predetermined value.

27. A radar apparatus according to claim 20, wherein a judgment criterion is determined in accordance with the measured distance.

28. A radar apparatus according to claim 20, wherein a final abnormality judgment is made based on continuity of a judgment result.

29. A radar apparatus according to claim 20, wherein a final abnormality judgment is made based on a frequency of occurrence of a judgment result.

30. A radar apparatus comprising:
a distance measuring unit measuring a distance to a target;
a relative velocity measuring unit measuring a relative velocity with respect to the target;
a unit computing an amount of change in distance from a measured value of the relative velocity and an elapsed time for each of a plurality of time intervals, computing a difference between the amount of change in distance accumulated over the plurality of time intervals and a corresponding measured value of the distance, and detecting an abnormality based on a ratio of the difference to the corresponding measured value of the distance.

31. A radar apparatus according to claim 30, wherein when the measured value of the distance or the relative velocity has not been obtained at a particular time, the data at that particular time is invalidated and the measurement is made once again.

32. A radar apparatus according to claim 30, wherein the abnormality detection is performed only on a target whose signal strength is larger than a predetermined value.

33. A radar apparatus according to claim 30, wherein the abnormality detection is performed only on a target whose measured distance is larger than a predetermined value.

34. A radar apparatus according to claim 30, wherein a final abnormality judgment is made based on continuity of a judgment result.

35. A radar apparatus according to claim 30, wherein a final abnormality judgment is made based on a frequency of occurrence of a judgment result.

36. A radar apparatus comprising:
a distance measuring unit measuring a distance to a target;
a relative velocity measuring unit measuring a relative velocity with respect to the target;
a unit computing an amount of change in distance from a measured value of the relative velocity and an elapsed time for each of a plurality of time intervals, computing a difference between the amount of change in distance accumulated over the plurality of time intervals and a corresponding measured value of the distance, and computing a ratio of the difference to the corresponding measured value of the distance a plurality of times; and
a unit detecting an abnormality based on an average value of the plurality of computed ratios.

37. A radar apparatus according to claim 36, wherein the average value is computed by excluding any data missing because of a failure to obtain the measured value of the distance or the relative velocity.

38. A radar apparatus according to claim 36, wherein the abnormality detection is performed only on a target whose signal strength is larger than a predetermined value.

39. A radar apparatus according to claim 36, wherein a number of times over which the average is to be taken is determined in accordance with signal strength of the target.

40. A radar apparatus according to claim 36, wherein a number of times over which the average is to be taken is determined in accordance with a magnitude of the measured relative velocity.

41. A radar apparatus according to claim 36, wherein the abnormality detection is performed only on a target whose measured distance is larger than a predetermined value.

42. A radar apparatus according to claim 36, wherein a final abnormality judgment is made based on continuity of a judgment result.

43. A radar apparatus according to claim 36, wherein a final abnormality judgment is made based on a frequency of occurrence of a judgment result.

* * * * *